United States Patent
Henzler et al.

(10) Patent No.: US 12,537,548 B2
(45) Date of Patent: Jan. 27, 2026

(54) LOAD MODULATED RADIO-FREQUENCY AMPLIFIER WITH DIGITAL PREDISTORTION

(71) Applicant: Apple Inc., Cupertino, CA (US)

(72) Inventors: Stephan Henzler, Munich (DE); Pedro Mirassol Tomé, Munich (DE); Andreas Langer, Munich (DE); Alexander Klinkan, Linz (AT)

(73) Assignee: Apple Inc., Cupertino, CA (US)

( * ) Notice: Subject to any disclaimer, the term of this patent is extended or adjusted under 35 U.S.C. 154(b) by 339 days.

(21) Appl. No.: 18/321,454

(22) Filed: May 22, 2023

(65) Prior Publication Data

US 2024/0014833 A1    Jan. 11, 2024

Related U.S. Application Data

(60) Provisional application No. 63/359,113, filed on Jul. 7, 2022.

(51) Int. Cl.
*H04B 1/04* (2006.01)
*H04B 1/00* (2006.01)

(52) U.S. Cl.
CPC ......... *H04B 1/0096* (2013.01); *H04B 1/0089* (2013.01); *H04B 1/0475* (2013.01); *H04B 2001/0416* (2013.01)

(58) Field of Classification Search
CPC .. H04B 1/0096; H04B 1/0089; H04B 1/0475; H04B 2001/0416; H03F 2200/102;
(Continued)

(56) References Cited

U.S. PATENT DOCUMENTS 5,898,338 A    4/1999  Proctor et al.
7,561,636 B2   7/2009  Song et al.
(Continued)

OTHER PUBLICATIONS

Haiying Cao et al., Linearization of Efficiency-Optimized Dynamic Load Modulation Transmitter Architectures, IEEE Transactions on Microwave Theory and Techniques, Apr. 1, 2010, pp. 873-881, vol. 58, No. 4, IEEE, USA.
(Continued)

*Primary Examiner* — Siu M Lee
(74) *Attorney, Agent, or Firm* — Treyz Law Group; Jason Tsai

(57) ABSTRACT

An electronic device may include wireless circuitry. The wireless circuitry may include at least a digital predistortion circuit, an upconversion circuit, and a load-line modulated amplifier circuit. The digital predistortion circuit can be configured to receive a reference baseband signal from one or more processors and to selectively output a predistorted version of the reference baseband signal. The upconversion circuit can be configured to receive a signal from the digital predistortion circuit and to output a radio-frequency signal. The load-line modulated amplifier circuit can be configured to amplify the radio-frequency signal. The load-line modulated amplifier circuit can include an adjustable load component. The adjustable load component can have a constant impedance when an instantaneous signal amplitude of the reference baseband signal is within a first range and can be tuned to have a varying impedance when the instantaneous signal amplitude of the reference baseband signal is within a second range.

18 Claims, 6 Drawing Sheets

(58) Field of Classification Search
CPC ......... H03F 2200/378; H03F 2200/381; H03F 1/0205; H03F 1/3241; H03F 3/19; H03F 3/245; H03G 3/3042
See application file for complete search history.

(56) References Cited

U.S. PATENT DOCUMENTS

| | | | |
|---|---|---|---|
| 8,498,591 | B1 | 7/2013 | Qian et al. |
| 8,548,403 | B2 | 10/2013 | Kim et al. |
| 9,002,302 | B1 | 4/2015 | Qian et al. |
| 2003/0107434 | A1* | 6/2003 | Mitzlaff ................ H03F 1/3247 330/149 |
| 2006/0229037 | A1 | 10/2006 | Quilligan |
| 2011/0148518 | A1* | 6/2011 | Lejon .................... H03F 1/3294 330/124 R |
| 2014/0155128 | A1* | 6/2014 | Dakshinamurthy ........................ H04W 52/0209 455/574 |
| 2014/0269988 | A1 | 9/2014 | Schafferer et al. |
| 2017/0047952 | A1 | 2/2017 | Kim et al. |
| 2019/0215023 | A1* | 7/2019 | Abouelenin ............ H03F 3/245 |
| 2022/0329212 | A1* | 10/2022 | Vellanki ................ H04R 29/001 |
| 2022/0385237 | A1* | 12/2022 | Lehtola ................... H04B 1/40 |

OTHER PUBLICATIONS

Frederick H. Raab, High-efficiency linear amplification by dynamic load modulation, IEEE MTT-S International Microwave Symposium Digest, 2003, Jun. 8-13, 2003, pp. 1717-1720, IEEE, USA.

* cited by examiner ns circuitry.

LOAD MODULATED RADIO-FREQUENCY AMPLIFIER WITH DIGITAL PREDISTORTION

This application claims the benefit of U.S. Provisional Patent Application No. 63/359,113, filed Jul. 7, 2022, which is hereby incorporated by reference herein in its entirety.

FIELD

This disclosure relates generally to electronic devices and, more particularly, to electronic devices with wireless communications circuitry.

BACKGROUND

Electronic devices are often provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

Radio-frequency signals transmitted by an antenna are often fed through one or more power amplifiers, which are configured to amplify low power analog signals to higher power signals more suitable for transmission through the air over long distances. It can be challenging to design a satisfactory power amplifier for an electronic device.

SUMMARY

An electronic device may include wireless communications circuitry. The wireless communications circuitry may include one or more processors or signal processing blocks for generating baseband signals, a transceiver for receiving the digital signals and for generating corresponding radio-frequency signals, and one or more radio-frequency power amplifiers configured to amplify the radio-frequency signals for transmission by one or more antennas in the electronic device. At least one of the radio-frequency power amplifiers can be implemented as a load modulated radio-frequency amplifier circuit. The load modulated radio-frequency amplifier circuit can include an amplifier core coupled to an adjustable load impedance. Such type of amplifier circuit can also be referred to as a load-line modulated radio-frequency power amplifier.

As aspect of the disclosure provides wireless circuit that includes: a digital predistortion circuit configured to receive a baseband reference signal and to selectively predistort the baseband reference signal to output either the baseband reference signal or a predistorted signal; an upconversion circuit configured to receive the baseband reference signal or the predistorted signal and configured to output a corresponding radio-frequency signal; and a load modulated amplifier circuit configured to receive the radio-frequency signal and to output a corresponding amplified radio-frequency signal. The load modulated amplifier circuit can include an adjustable load component having a constant impedance when an instantaneous signal amplitude of the baseband reference signal or the predistorted signal is within a first range and having a varying impedance when the instantaneous signal amplitude of the reference signal or the predistorted signal is within a second range different than the first range. The wireless circuitry can further include a gain shaping circuit configured to receive the baseband reference signal or the predistorted signal and to output a control signal for tuning the adjustable load component. The gain shaping circuit can be configured to keep the control signal constant when the instantaneous signal amplitude of the baseband reference signal or the predistorted signal is within the first range and to vary the control signal when the instantaneous signal amplitude of the baseband reference signal or the predistorted signal is within the second range.

The wireless circuitry can further include: a radio-frequency coupler coupled between the load modulated amplifier circuit and the antenna; a downconversion circuit configured to demodulate a radio-frequency signal coupled from the radio-frequency coupler to generate a corresponding demodulated signal; an analog-to-digital converter configured to convert the demodulated signal from an analog domain to a digital domain to generate a corresponding measured signal; an alignment circuit configured to phase and time align the baseband reference signal and the measured signal or to phase and time align the predistorted signal and the measured signal; a gain calculation circuit configured to receive the baseband reference signal and the measured signal and further configured to compute an instantaneous gain value based on the received baseband reference signal and the received measured signal; and a gain shape analyzer circuit configured to receive the computed instantaneous gain value, to monitor recently computed gain values output from the gain calculation circuit, and to output information to the gain shaping circuit.

An aspect of the disclosure provides a method of operating wireless circuitry that includes receiving a baseband signal from one or more processors, upconverting the baseband signal to a radio-frequency signal, amplifying the radio-frequency signal with a load modulated amplifier circuit, providing a control signal to an adjustable load component in the load modulated amplifier circuit, keeping the control signal constant when an instantaneous amplitude of the baseband signal is within a first range, and varying the control signal when the instantaneous amplitude of the baseband signal is within a second range non-overlapping with the first range. The method can further include predistorting the baseband signal to linearize a gain of the load modulated amplifier circuit, using a gain shaping circuit to output the control signal, downconverting a portion of the amplified radio-frequency signal to produce a demodulated signal, converting the demodulated signal from an analog domain to a digital domain to produce a measured signal, aligning the measured signal and the baseband signal in phase and time, computing an instantaneous gain value based on the baseband signal and the measured signal, analyzing the instantaneous gain value to determine whether a derivative of the gain of the load modulated amplifier circuit is continuous, and adjusting the gain shaping circuit in response to determining that the derivative of the gain of the load modulated amplifier circuit is not continuous.

An aspect of the disclosure provides an electronic device that includes one or more processors configured to generate a baseband signal, a predistortion circuit configured to selectively predistort the baseband signal to output either the baseband signal or a predistorted signal, a modulator configured to convert the baseband signal or the predistorted signal to a radio-frequency signal, a load-line modulated amplifier circuit configured to amplify the radio-frequency signal, and gain shaping circuitry having a first input configured to receive the baseband signal from the one or more processors, a second input configured to receive a portion of the amplified radio-frequency signal via a radio-frequency coupler, a third input configured to receive the baseband signal or the predistorted signal from the predistortion circuit, and an output coupled to an adjustable impedance in the load-line modulated amplifier circuit.

The gain shaping circuitry can include a gain shaping circuit configured to generate a control signal for tuning the adjustable impedance based on an instantaneous signal amplitude of the baseband signal or the predistorted signal. The control signal can have a constant value when the instantaneous signal amplitude of the baseband signal or the predistorted signal is within a first signal range and can have a varying value when the instantaneous signal amplitude of the baseband signal or the predistorted signal is within a second signal range greater than the first signal range. The gain shaping circuitry can include a demodulator configured to convert the portion of the amplified radio-frequency signal to a demodulated signal, an analog-to-digital converter configured to convert the demodulated signal to a digital measured signal, a gain calculation circuit configured to compute a gain value based on the baseband signal and the digital measured signal, and a gain shape analyzing circuit configured to monitor the computed gain value and to provide information to the gain shaping circuit.

DETAILED DESCRIPTION

Figure 1:
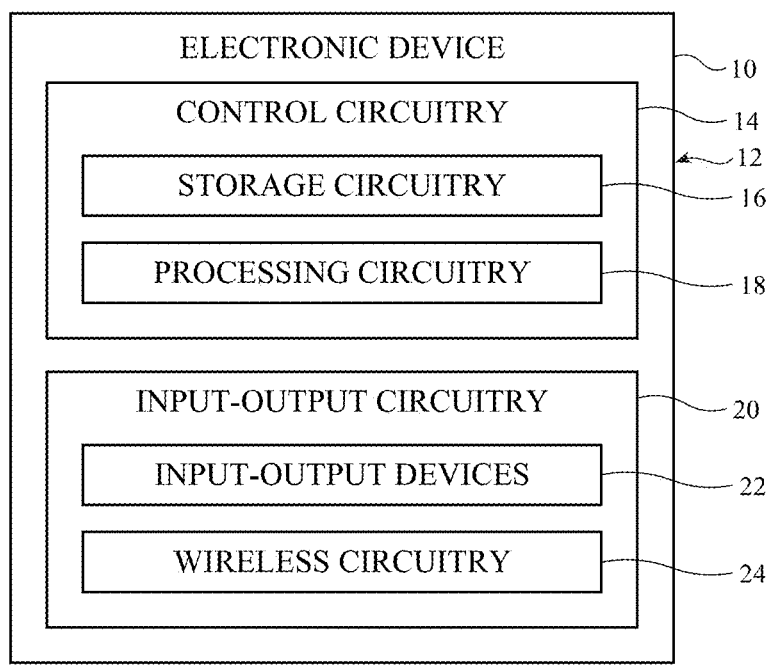
FIG. 1 is a diagram of an illustrative electronic device having wireless circuitry in accordance with some embodiments.

An electronic device such as device 10 of FIG. 1 may be provided with wireless circuitry. The wireless circuitry may include a processor for generating baseband signals, an upconversion circuit for upconverting (mixing) the baseband signals into radio-frequency signals, an amplifier for amplifying the radio-frequency signals, and an antenna for radiating the amplified radio-frequency signals. The amplifier may be a load-line modulated radio-frequency power amplifier having an adjustable load component.

The wireless circuitry can include a gain shaping circuit configured to output a control signal for tuning the adjustable load component. The control signal can be kept constant during a first range of instantaneous amplifier input signal power levels and can be varied during a second range of instantaneous amplifier input signal power levels. The gain shaping circuit is configured to tune the control signals such that a gain of the load-line modulated amplifier transitions smoothly between the first and second ranges of instantaneous amplifier input signal power levels. The wireless circuitry can further include a digital predistortion circuit having a predistortion gain that equalizes or linearizes the gain of the load-line modulated amplifier.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed from plastic, glass, ceramics, fiber composites, metal (e.g., stainless steel, aluminum, metal alloys, etc.), other suitable materials, or a combination of these materials. In some embodiments, parts or all of housing 12 may be formed from dielectric or other low-conductivity material (e.g., glass, ceramic, plastic, sapphire, etc.). In other embodiments, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using the antenna(s).

Wireless circuitry 24 may transmit and/or receive radio-frequency signals within a corresponding frequency band at radio frequencies (sometimes referred to herein as a communications band or simply as a "band"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Figure 2:
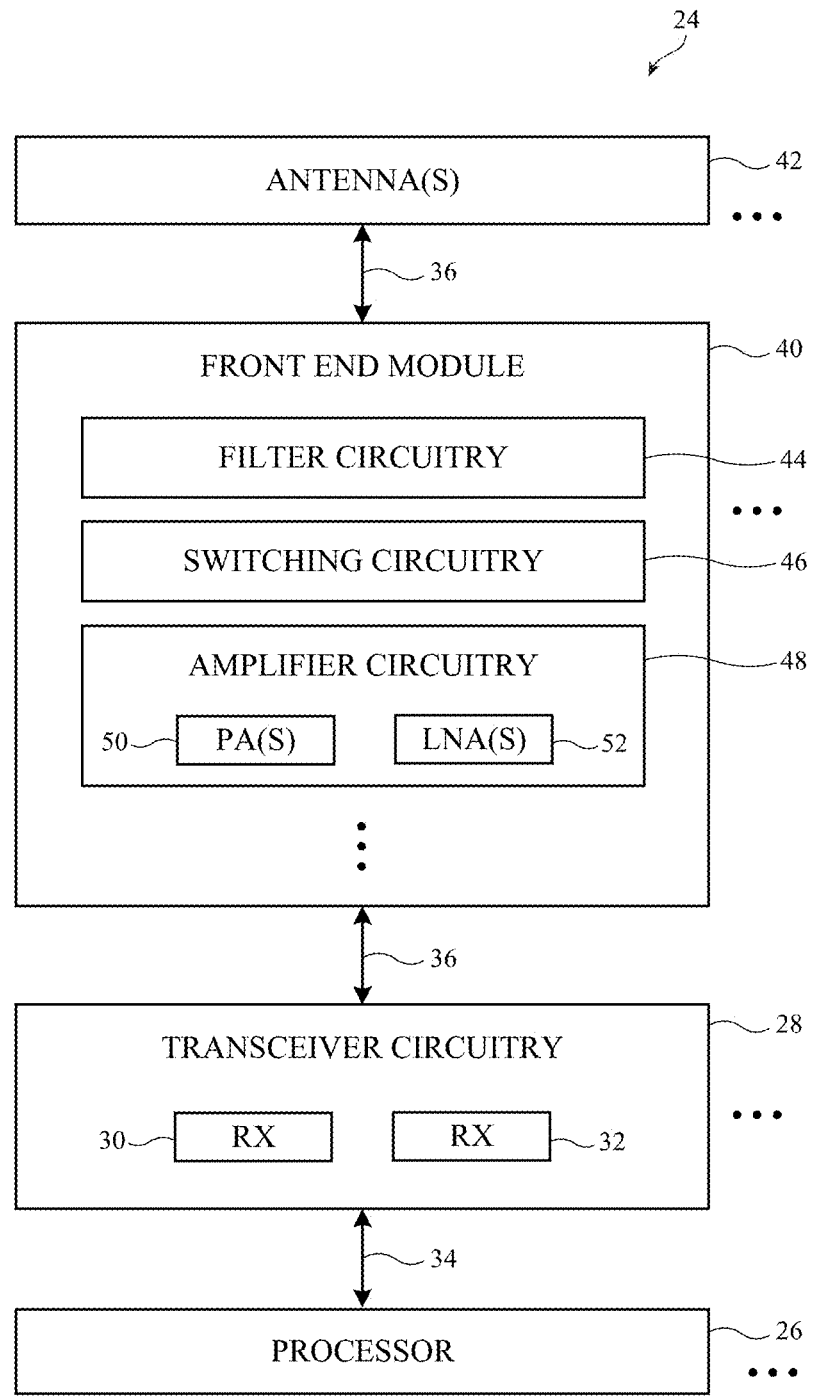
FIG. 2 is a diagram of illustrative wireless circuitry having amplifiers in accordance with some embodiments.

FIG. 2 is a diagram showing illustrative components within wireless circuitry 24. As shown in FIG. 2, wireless circuitry 24 may include a processor such as processor 26, radio-frequency (RF) transceiver circuitry such as radio-frequency transceiver 28, radio-frequency front end circuitry such as radio-frequency front end module (FEM) 40, and antenna(s) 42. Processor 26 may be a baseband processor, application processor, general purpose processor, microprocessor, microcontroller, digital signal processor, host processor, application specific signal processing hardware, power management unit, or other type of processor. Processor 26 may be coupled to transceiver 28 over path 34. Transceiver 28 may be coupled to antenna 42 via radio-frequency transmission line path 36. Radio-frequency front end module 40 may be disposed on radio-frequency transmission line path 36 between transceiver 28 and antenna 42.

In the example of FIG. 2, wireless circuitry 24 is illustrated as including only a single processor 26, a single transceiver 28, a single front end module 40, and a single antenna 42 for the sake of clarity. In general, wireless circuitry 24 may include any desired number of processors 26, any desired number of transceivers 36, any desired number of front end modules and any desired number of antennas 42. Each processor 26 may be coupled to one or more transceiver 28 over respective paths 34. Each transceiver 28 may include a transmitter circuit 30 configured to output uplink signals to antenna 42, may include a receiver circuit 32 configured to receive downlink signals from antenna 42, and may be coupled to one or more antennas 42 over respective radio-frequency transmission line paths 36. Each radio-frequency transmission line path 36 may have a respective front end module 40 disposed thereon. If desired, two or more front end modules 40 may be disposed on the same radio-frequency transmission line path 36. If desired, one or more of the radio-frequency transmission line paths 36 in wireless circuitry 24 may be implemented without any front end module disposed thereon.

Radio-frequency transmission line path 36 may be coupled to an antenna feed on antenna 42. The antenna feed may, for example, include a positive antenna feed terminal and a ground antenna feed terminal. Radio-frequency transmission line path 36 may have a positive transmission line signal path such that is coupled to the positive antenna feed terminal on antenna 42. Radio-frequency transmission line path 36 may have a ground transmission line signal path that is coupled to the ground antenna feed terminal on antenna 42. This example is illustrative and, in general, antennas 42 may be fed using any desired antenna feeding scheme. If desired, antenna 42 may have multiple antenna feeds that are coupled to one or more radio-frequency transmission line paths 36.

Radio-frequency transmission line path 36 may include transmission lines that are used to route radio-frequency antenna signals within device 10 (FIG. 1). Transmission lines in device may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 36 may be integrated into rigid and/or flexible printed circuit boards.

In performing wireless transmission, processor 26 may provide transmit signals (e.g., digital or baseband signals) to transceiver 28 over path 34. Transceiver 28 may further include circuitry for converting the transmit (baseband) signals received from processor 26 into corresponding radio-frequency signals. For example, transceiver circuitry 28 may include mixer circuitry for up-converting (or modulating) the transmit (baseband) signals to radio frequencies prior to transmission over antenna 42. The example of FIG. 2 in which processor 26 communicates with transceiver 28 is illustrative. In general, transceiver 28 may communicate with a baseband processor, an application processor, general purpose processor, a microcontroller, a microprocessor, or one or more processors within circuitry 18. Transceiver circuitry 28 may also include digital-to-analog converter (DAC) and/or analog-to-digital converter (ADC) circuitry for converting signals between digital and analog domains. Transceiver 28 may use transmitter (TX) 30 to transmit the radio-frequency signals over antenna 42 via radio-frequency transmission line path 36 and front end module 40. Antenna 42 may transmit the radio-frequency signals to external wireless equipment by radiating the radio-frequency signals into free space.

Front end module (FEM) 40 may include radio-frequency front end circuitry that operates on the radio-frequency signals conveyed (transmitted and/or received) over radio-frequency transmission line path 36. FEM 40 may, for example, include front end module (FEM) components such as radio-frequency filter circuitry 44 (e.g., low pass filters, high pass filters, notch filters, band pass filters, multiplexing circuitry, duplexer circuitry, diplexer circuitry, triplexer circuitry, etc.), switching circuitry 46 (e.g., one or more radio-frequency switches), radio-frequency amplifier circuitry 48 (e.g., one or more power amplifier circuits 50 and/or one or more low-noise amplifier circuits 52), impedance matching circuitry (e.g., circuitry that helps to match the impedance of antenna 42 to the impedance of radio-frequency transmission line 36), antenna tuning circuitry (e.g., networks of capacitors, resistors, inductors, and/or switches that adjust the frequency response of antenna 42), radio-frequency coupler circuitry, charge pump circuitry, power management circuitry, digital control and interface circuitry, and/or any other desired circuitry that operates on the radio-frequency signals transmitted and/or received by antenna 42. Each of the front end module components may be mounted to a common (shared) substrate such as a rigid printed circuit board substrate or flexible printed circuit substrate. If desired, the various front end module components may also be integrated into a single integrated circuit chip. If desired, amplifier circuitry 48 and/or other components in front end 40 such as filter circuitry 44 may also be implemented as part of transceiver circuitry 28.

Filter circuitry 44, switching circuitry 46, amplifier circuitry 48, and other circuitry may be disposed along radio-frequency transmission line path 36, may be incorporated into FEM 40, and/or may be incorporated into antenna 42 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna 42 over time.

Transceiver 28 may be separate from front end module 40. For example, transceiver 28 may be formed on another substrate such as the main logic board of device 10, a rigid printed circuit board, or flexible printed circuit that is not a part of front end module 40. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, processor 26 and/or portions of transceiver 28 (e.g., a host processor on transceiver 28) may form a part of control circuitry 14. Control circuitry 14 (e.g., portions of control circuitry 14 formed on processor 26, portions of control circuitry 14 formed on transceiver 28, and/or portions of control circuitry 14 that are separate from wireless circuitry 24) may provide control signals (e.g., over one or more control paths in device 10) that control the operation of front end module 40.

Transceiver circuitry 28 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network transceiver circuitry that handles the 2.4 GHz Bluetooth® band or other WPAN communications bands, cellular telephone transceiver circuitry that handles cellular telephone bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), near-field communications (NFC) transceiver circuitry that handles near-field communications bands (e.g., at 13.56 MHz), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired communications bands of interest.

Wireless circuitry 24 may include one or more antennas such as antenna 42. Antenna 42 may be formed using any desired antenna structures. For example, antenna 42 may be an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc. Two or more antennas 42 may be arranged into one or more phased antenna arrays (e.g., for conveying radio-frequency signals at millimeter wave frequencies). Parasitic elements may be included in antenna 42 to adjust antenna performance. Antenna 42 may be provided with a conductive cavity that backs the antenna resonating element of antenna 42 (e.g., antenna 42 may be a cavity-backed antenna such as a cavity-backed slot antenna).

As described above, front end module 40 may include one or more power amplifiers (PA) circuits 50 in the transmit (uplink) path. A power amplifier 50 (sometimes referred to as radio-frequency power amplifier, transmit amplifier, or amplifier) may be configured to amplify a radio-frequency signal without changing the signal shape, format, or modulation. Amplifier 50 may, for example, be used to provide 10 dB of gain, 20 dB of gain, 10-20 dB of gain, less than 20 dB of gain, more than 20 dB of gain, or other suitable amounts of gain.

It can be challenging to design a satisfactory radio-frequency power amplifier for an electronic device. In certain applications, the radio-frequency power amplifier can be implemented as a load-line modulated radio-frequency power amplifier. The gain of a load-line modulated radio-frequency power amplifier can be, however, relatively non-linear. For instance, the gain of a load-line modulated radio-frequency power amplifier can exhibit gain expansion, a phenomenon where the gain of the amplifier is relatively flat at lower signal power levels but increases within a range of intermediate signal power levels before dropping off at higher signal power levels.

A load-line modulated radio-frequency power amplifier has an adjustable load component (including an adjustable load line) that can be tuned to provide different gain profiles, all of which generally exhibit gain expansion. For a first range of instantaneous amplifier input signal power levels less than a certain threshold, the load line can be set constant (referred to as an unmodulated region of operation). For a second range of instantaneous amplifier input signal power levels greater than the threshold, the load line can be varied (referred to as a modulated region of operation). Load-line modulated radio-frequency power amplifiers can employ an iso-gain shaping methodology that tunes the load line to produce a flat gain response for the second range of instantaneous amplifier input signal power levels.

Due to the gain expansion of the different profiles, however, the gain of the load-line modulated radio-frequency power amplifier will transition between a gain expansion type profile, which has a curved response, for signals in the first range of instantaneous amplifier input signal power levels and a flat gain response for signals in the second range of instantaneous amplifier input signal power levels. In other words, there might be an abrupt transition (or kink) in the overall amplifier gain when changing between the modulated and unmodulated regions of operation. Having an abrupt transition in the overall gain makes the load-line modulated radio-frequency power amplifier very sensitive to variations and makes it more difficult to design a digital predistortion circuit that operates in conjunction with the load-line modulated radio-frequency power amplifier.

Figure 3:
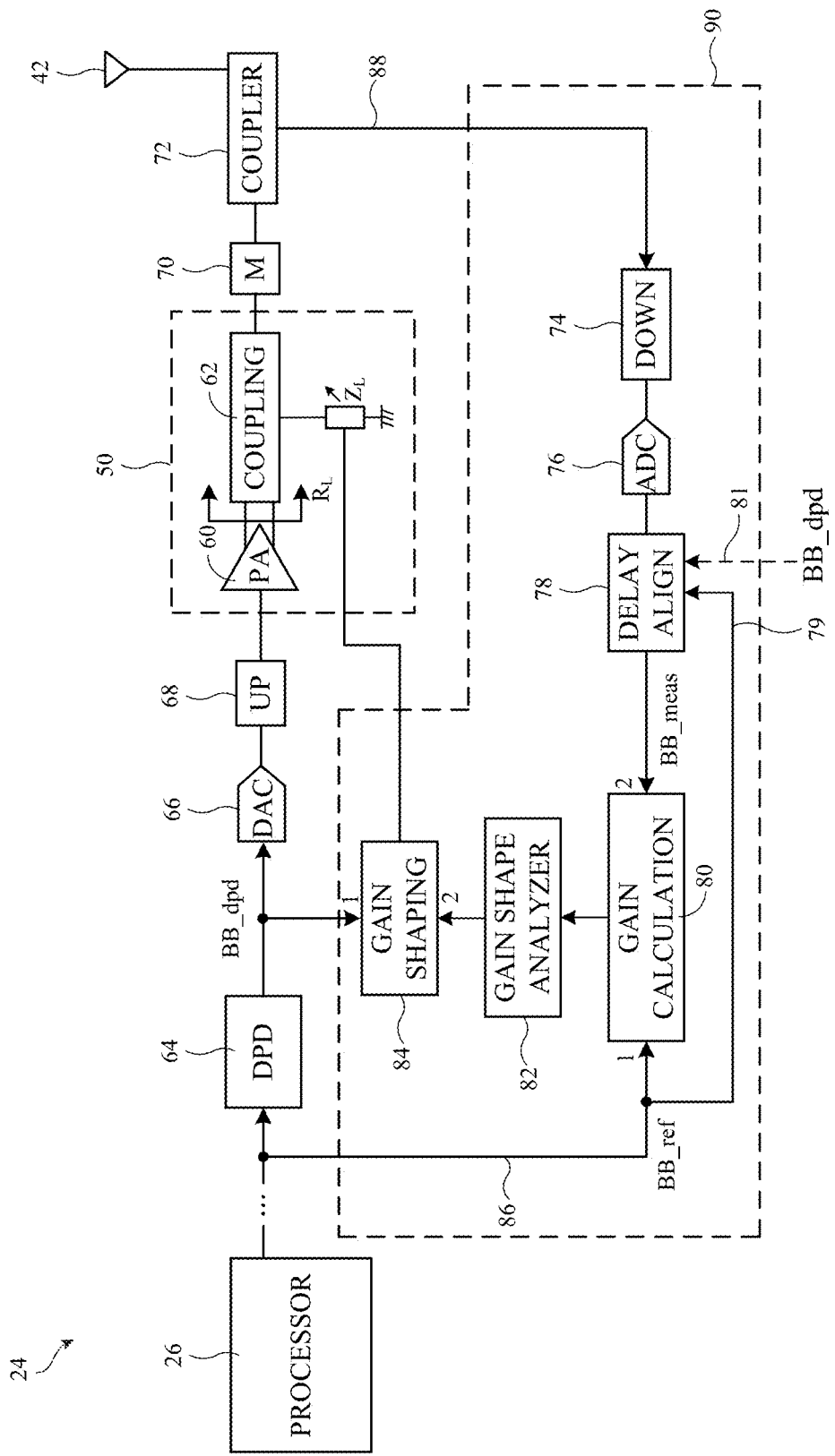
FIG. 3 is a diagram of illustrative wireless circuitry having a load modulated amplifier, a gain shaping circuit for controlling the load modulated amplifier, and a digital predistortion circuit for predistorting signals that are fed to an input of the load modulated amplifier in accordance with some embodiments.

FIG. 3 is a diagram of illustrative wireless circuitry 24 having a load-line modulated amplifier circuit and associated gain shaping circuitry configured to provide a smooth gain curve for a wide range of instantaneous amplifier input signal power levels (e.g., for a wide range of instantaneous signal amplitudes). As shown in FIG. 3, wireless circuitry 24 may include processor 26 configured to generate baseband signals, a digital predistortion (DPD) circuit such as digital predistortion circuit 64, a data converter such as digital-to-analog converter (DAC) 66, an upconversion circuit such as upconverter 68, a load-line modulated radio-frequency power amplifier circuit such as amplifier circuit 50, a matching circuit 70, and an antenna 42 configured to radiate radio-frequency signals output from amplifier circuit 50.

Processor 26 may represent one or more processors such as a baseband processor, an application processor, a digital signal processor, a microcontroller, a microprocessor, a central processing unit (CPU), a programmable device, a combination of these circuits, and/or one or more processors within circuitry 18. Processor 26 may be configured to generate digital (baseband) signals. Signals generated at the output of processor 26 are sometimes referred to as baseband signals, digital signals, or transmit signals. As examples, the digital signals generated by processor 26 may include in-phase (I) and quadrature-phase (Q) signals, radius and phase signals, or other digitally-coded signals.

The digital predistortion circuit 64 may receive the digital baseband signals from processor 26 and may predistort the received digital baseband signals (e.g., to alter the gain response of the digital baseband signals) to generate corresponding predistorted digital baseband signals (see signals BB_dpd). Predistorting signals in this way can help equalize a non-linear gain behavior and/or a non-linear phase-shift behavior of amplifier circuit 50 so that the overall response of signals being transmitted through amplifier circuit 50 is linearized. Digital predistortion circuit 64 can be selectively activated. When predistortion circuit 64 is activated or switched into use, circuit 64 can generate predistorted digital baseband signal BB_dpd. When predistortion circuit 64 is deactivated or switched out of use (bypassed), the digital baseband signals output from processor 26 can pass through circuit 64 without being predistorted. In general, signal BB_dpd may represent predistorted signals (when DPD circuit 64 is enabled) or non-predistorted signals (when DPD circuit 64 is idle).

The digital baseband signals output from digital predistortion circuit 64 (whether or not distorted by circuit 64) may be converted from the digital domain into the analog domain using digital-to-analog converter 66 and then upconverted (modulated) to radio frequencies, using upconverter 68, from the baseband frequency range (which is typically in the range of a couple hundred kHz to a couple hundred MHz) to radio frequencies in the range of hundreds of MHz or in the GHz range. Upconverter 68 is sometimes referred to as a radio-frequency modulator or a radio-frequency mixer.

The upconverted radio-frequency signals may be fed as an input to amplifier circuit 50. Amplifier circuit 50 may include an amplifier 60 having an input configured to receive the upconverted radio-frequency signals from modulator 68 and having an output coupled to an adjustable load component. The adjustable load component may include a coupling circuit 62 and an adjustable impedance $Z_L$. Coupling circuit 62 can be implemented as a transformer (as an example). Adjustable impedance $Z_L$ may be an adjustable resistance, an adjustable capacitance, an adjustable inductance, other reactive or lossless electrical component, a combination of these components, or other adjustable component(s).

Adjusting impedance $Z_L$ can tune the load impedance seen by amplifier 60 from its output (see, e.g., load impedance $R_L$ seen by the amplifier core), which can shift the gain curve response of amplifier circuit 50. For instance, impedance $Z_L$ can be tuned to lower the amplifier core load impedance $R_L$, which can shift the amplifier gain to a gain curve with higher gain. As another example, impedance $Z_L$ can be tuned to increase the amplifier core load impedance $R_L$, which can shift the amplifier gain to a gain curve with less gain. Amplifier circuit 50 of this type can be defined or referred to as a load-line modulated radio-frequency amplifier or a load modulated radio-frequency amplifier. Coupling circuit 62 may have an input coupled to the output of amplifier 60, may be coupled to adjustable impedance $Z_L$, and may have an output coupled to matching circuit 70. Matching circuit 70 may be configured to match the output impedance of amplifier circuit 50 with the impedance of antenna 42.

The adjustable load component of load modulated amplifier circuit 50 can be tuned using gain shaping circuitry 90. Gain shaping circuitry 90 may include a first input configured to receive a reference baseband signal BB_ref from processor 26, a second input configured to receive a radio-frequency signal from the output of amplifier circuit 50 via a radio-frequency coupler 72 connected between matching circuit 70 and antenna 42, a third input configured to receive the predistorted baseband signals BB_dpd from the output of digital predistortion circuit 64, and an output coupled to adjustable impedance $Z_L$. Gain shaping circuitry 90 may include a downconversion circuit such as downconverter 74 configured to receive the radio-frequency signals from coupler 72 via a feedback path 88 and to demodulate the radio-frequency signals from radio frequencies down to baseband frequencies. Radio-frequency coupler 72 may be configured to couple a portion of the amplified radio-frequency signals output from amplifier circuit 50 onto feedback (measurement) path 88. Downconverter 74 is sometimes referred to as a radio-frequency demodulator or mixer. Gain shaping circuitry 90 may also include an analog-to-digital converter (ADC) 76 configured to convert the demodulated signals from the analog domain to the digital domain. The demodulated digital signal generated at the output of ADC 76 is sometimes referred to as a measured signal BB_meas or a measured (feedback) digital baseband signal. Gain shaping circuitry 90 may optionally include a delay alignment circuit 78 configured to delay or advance the measured signal with respect to the reference signal BB_ref so that reference signal BB_ref and measured signal BB_meas are phase and time aligned. To perform the alignment, circuit 78 may also receive signal BB_ref via input path 79. This is illustrative. Alternatively, alignment circuit 78 can instead receive signal BB_dpd via input path 81 and compare BB_dpd to the signal output from ADC 76 to perform the desired phase and time alignment (e.g., to phase and time align the predistorted signal and the measured signal). Alignment circuit 78 being disposed in the feedback path is illustrative. Alternatively, alignment circuit 78 can be disposed in the reference path 86 to delay or advance the reference signal with respect to the measure signal to phase and time align the signals BB_ref and BB_meas.

Gain shaping circuitry 90 may further include a gain calculation circuit such as gain calculator 80, a gain shape analyzing circuit such as gain shape analyzer 82, and a gain shaping circuit such as gain shaper 84. Gain calculation circuit 80 may have a first input configured to receive reference digital baseband signal BB_ref and a second input configured to receive measured digital baseband (demodulated) signal BB_meas. Gain calculation circuit 80 may be configured to compute an instantaneous gain value k for the transmit path. Gain calculation circuit 80 may, for example, compute the instantaneous gain by computing a ratio of BB_meas to BB_ref. The gain calculation circuit 80 may output the computed instantaneous gain value to gain shape analyzing circuit 82.

The example of FIG. 3 in which gain calculation circuit 80 computes an instantaneous gain based on BB_ref and BB_meas is illustrative. In another embodiment, gain calculation circuit 80 can have a first input configured to receive signal BB_dpd from the output of digital predistortion circuit 64. In such scenario, gain calculation circuit 80 can compute the gain value based on BB_dpd and BB_meas. In yet other embodiments, gain calculation circuit 80 can have first inputs configured to receive both signals BB_ref and BB_dpd. In such scenario, gain calculation circuit 80 can compute the gain value based on BB_ref, BB_dpd, and BB_meas.

Gain shape analyzing circuit 82 may be configured to monitor the instantaneous gain value output from gain calculation circuit 80 for abrupt transitions or kinks in the overall gain curve. For example, gain shape analyzing circuit 82 may include memory for storing recently computed gain values and may compute a first derivative of the recently computed gain values to obtain a derivative curve. If the computed derivative curve is continuous, then the gain of the transmit path can be considered to be transitioning smoothly. If the computed derivative curve is discontinuous (e.g., if the derivative value suddenly increases or decreases by more than 5%, more than 10%, by more than 20%, by more than 30%, by more than 40%, or by more than 50%, etc.), then the gain of the transmit path can be considered to exhibit an abrupt transition. In response to detecting an abrupt transition, gain shape analyzer 82 may alert gain shaping circuit 84 or otherwise provide information to the gain shaping circuit 84 that would enable circuit 84 to mitigate the detected kink in the gain response.

Gain shaping circuit 84 may have a first input configured to receive baseband signals from the output of digital predistortion circuit 64, a second input configured to receive information from gain shape analyzer 82, and an output coupled to adjustable impedance $Z_L$ in the load modulated amplifier circuit 50. The baseband signals received at the first input of gain shaping circuit 84 may be predistorted by circuit 84 (if circuit 84 is activated) or may not be predistorted (if predistortion circuit 84 is deactivated). Gain shaping circuit 84 may be configured to tune adjustable impedance $Z_L$ so that a forward gain of load modulated amplifier circuit 50 has a continuous (smooth) gain trajectory across an entire operating range of input signal power levels.

The example of FIG. 3 in which the first input of gain shaping circuit 84 is coupled to the output of digital predistortion circuit 64 is illustrative. In another embodiment, gain shaping circuit 84 can have a first input configured to receive baseband signals BB_ref from the output of processor 26. Digital predistortion circuit 64 may or may not be active. In yet other embodiments, gain shaping circuit 84 can have inputs configured to receive both signal BB_ref from the output of processor 26 and signal BB_dpd from the output of digital predistortion circuit 64.

Figure 4:
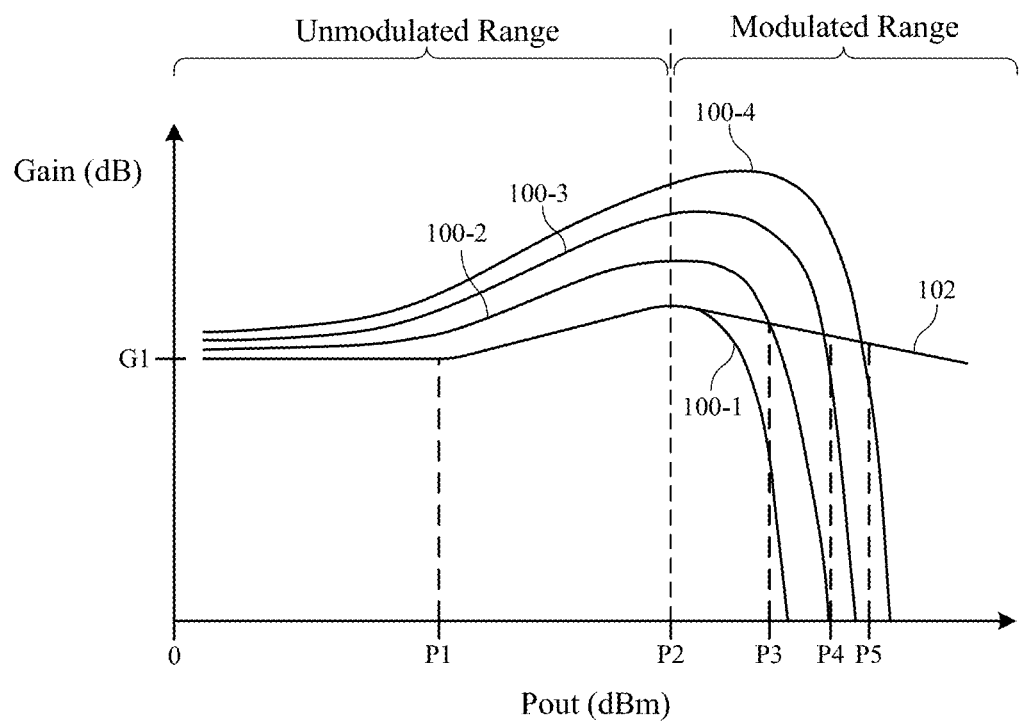
FIG. 4 is a plot of an illustrative amplifier gain curve that transitions smoothly between an unmodulated range and a modulated range in accordance with some embodiments.

FIG. 4 is a diagram plotting amplifier gain as a function of amplifier output power level Pout. Gain curve 100-1 represents a first gain response corresponding to $Z_L$ being tuned by gain shaping circuit 84 to a first impedance value. Gain curve 100-2 represents a second gain response corresponding to $Z_L$ being tuned by gain shaping circuit 84 to a second impedance value different than the first impedance value. Gain curve 100-3 represents a third gain response corresponding to $Z_L$ being tuned by gain shaping circuit 84 to a third impedance value different than the first and second impedance values. Gain curve 100-4 represents a fourth gain response corresponding to $Z_L$ being tuned by gain shaping circuit 84 to a fourth impedance value different than the first, second, and third impedance values. As shown in FIG. 4, the different gain curves all exhibit gain expansion (e.g., the gain is relatively flat for output power levels less than P1 but begins rising for output power levels greater than P1 and then drops off sometime after output power level P2).

In accordance with an embodiment, gain shaping circuit 84 may dynamically tune load modulated amplifier circuit 50 so that amplifier circuit 50 exhibits a forward gain response similar to forward gain response (trajectory) 102 as shown in FIG. 4. During normal transmission operations, the power level of signals output from amplifier circuit 50 can vary between P1 and P5 (as an example). For a first range of instantaneous amplifier input signal power levels (e.g., for a first range of instantaneous amplifier input signal amplitudes) that produce amplifier output power levels equal to or less than P2, the lowest gain curve such as gain curve 100-1 can be selected (see, e.g., how gain curve 100-1 coincides perfectly with desired gain response 102 for output power levels less than P2). The desired forward gain response 102 corresponding to the first range of instantaneous amplifier input signal power levels can therefore be achieved using a constant $Z_L$ value. The first range of instantaneous amplifier input signal power levels corresponding to output power levels less than or equal to P2 can therefore sometimes be referred to as an unmodulated signal range. The first range of instantaneous amplifier input signal amplitudes may be different than the second range of instantaneous amplifier input signal amplitudes (e.g., the first and second ranges are non-overlapping).

For a second range of instantaneous amplifier input signal power levels (e.g., for a second range of instantaneous amplifier input signal amplitudes) that produce amplifier output power levels greater than P2, staying on the lowest gain curve 100-1 will not yield the desired gain response 102 since gain curve 100-1 starts to drop off substantially after P2. Thus, for the second range of instantaneous amplifier input signal power levels, gain shaping circuit 84 can dynamically tune impedance $Z_L$ to jump from one curve to another to stay on the desired gain trajectory 102. For example, gain curve 100-2 may be used for an input signal power level in the second range producing output power P3; gain curve 100-3 may be used for an input signal power level in the second range producing output power P4; and gain curve 100-4 may be used for an input signal power level in the second range producing output power P5. The example of FIG. 4 showing four gain curves 100-1, 100-2, 100-3, and 100-4 corresponding to four different $Z_L$ values is illustrative. In general, $Z_L$ can be actively adjusted to provide more than four gain curves, 4-10 different gain curves, 10-20 gain curves, or more than 20 gain curves so that at least one of the gain curves can be selected to stay on the desired gain trajectory 102. Since $Z_L$ is varied in this range to jump between the different gain curves, the second range of instantaneous amplifier input signal power levels corresponding to output power greater than P2 can therefore sometimes be referred to as a modulated signal range.

Configured and operated in this way, the forward gain response 102 can exhibit a smooth transition between the unmodulated signal range and the modulated signal range. The modulated portion of gain response 102 should extend tangentially to the unmodulated portion of gain response 102. In other words, a first derivative of the forward gain response 102 should be continuous at the transition between the unmodulated and modulated signal ranges. To achieve this type of continuity and tangential gain curve behavior, the modulated portion of gain response 102 cannot be flat. For example, the amplifier gain must change for different signal power levels in the modulated range. This type of operation can sometimes be referred to herein as a hetero-gain shaping methodology, which is different than an iso-gain shaping method. In other words, the gain can vary when the instantaneous signal amplitude of the predistorted signal is within the unmodulated range and can also vary when the instantaneous signal amplitude of the predistorted signal is within the modulated range. Having a smooth forward gain response can help relax bandwidth requirements for one or more circuits along the transmit path.

Figure 5:
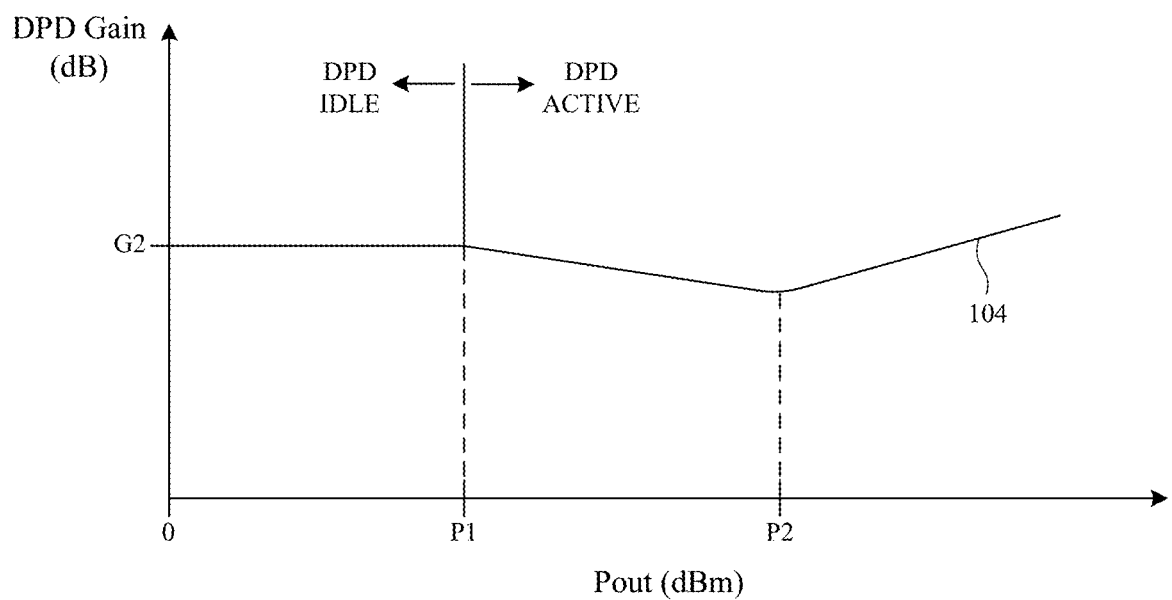
FIG. 5 is a plot of an illustrative gain profile of a digital predistortion circuit in accordance with some embodiments.

In the example of FIG. 4, the forward gain trajectory 102 produced by actively modulating the adjustable component of amplifier circuit 50 is not flat (e.g., gain response 102 ramps up slightly from P1 to P2 and ramps down slightly after P2). To compensate for this varying (non-flat) forward gain trajectory 102, digital predistortion circuit 64 can predistort the baseband signals by providing a predistortion gain response that equalizes the non-flat curvature of gain response 102. FIG. 5 shows an illustrative gain response 104 that can be provided by predistortion circuit 64. The predistortion gain response 104 has a shape that counteracts with the shape of amplifier gain trajectory 102. Thus, predistortion circuit 64 can be used to equalize the forward gain response of amplifier circuit 50, which linearizes the overall gain of the transmit path. As shown in FIG. 5, predistortion gain response 104 is a smooth response curve. This can be technically advantageous since the predistortion gain response 104 can be mapped or implemented using a single polynomial digital predistortion function (i.e., no piecewise digital predistortion is needed).

Digital predistortion can be turned off (idled) for a portion of the first range of instantaneous amplifier input signal power levels corresponding to amplifier output power levels less than or equal to P1 (see, e.g., a flat portion of the DPD gain response 104). Digital predistortion can be turned on (activated) for another portion of the first range of instantaneous amplifier input signal power corresponding to amplifier output power levels greater than P1 and less than or equal to P2 (see, e.g., the decreasing portion of the DPD gain response 104). Digital predistortion should remain on (activated) for the second range of instantaneous amplifier input signal power corresponding to amplifier output power levels greater than P2 (see, e.g., the increasing portion of the DPD gain response 104).

Figure 6:
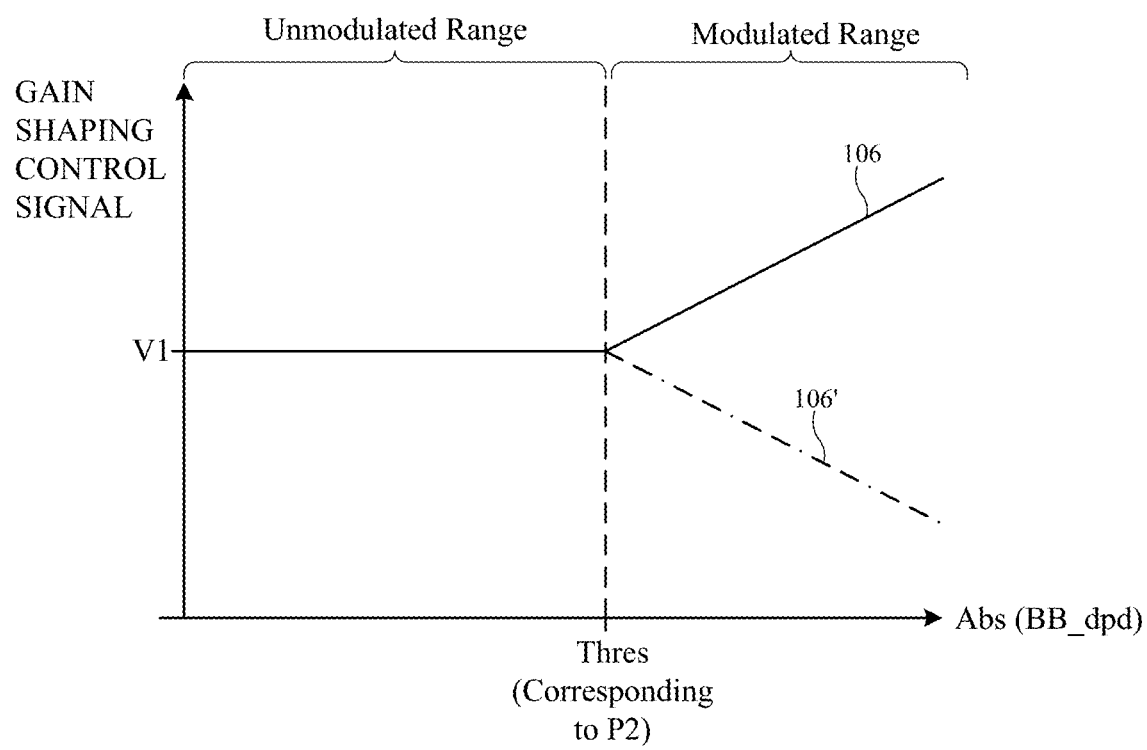
FIG. 6 is a plot showing how an illustrative control signal output from the gain shaping circuit can be constant in the unmodulated range and can be varied in the modulated range in accordance with some embodiments.

Gain shaping circuit 84 can thus be configured to modulate the adjustable impedance $Z_L$ of amplifier circuit 50 based on the baseband signals output from digital predistortion circuit 64. Gain shaping circuit 84 is sometimes referred to as an amplifier load impedance tuning (adjustment) circuit. Gain shaping circuit 84 may output a control signal for tuning adjustable impedance $Z_L$. FIG. 6 is a plot showing how an illustrative control signal output from the gain shaping circuit can be modulated depending on the instantaneous absolute signal power level of baseband signal BB_dpd generated at the output of predistortion circuit 64. The control signal output by gain shaping circuit 84 is sometimes referred to as a gain shaping control signal.

As shown in FIG. 6, the gain shaping control signal can be held at a constant value V1 for baseband signals in an unmodulated signal range, which can correspond to the first range of instantaneous amplifier input signal power levels that produce amplifier output levels up to P2 shown in the example of FIG. 4. The gain shaping control signal can be dynamically varied for baseband signals in a modulated signal range (see increasing line 106), which can correspond to the second range of instantaneous amplifier input signal power levels that produce amplifier output levels exceeding P2 shown in the example of FIG. 4. The example of FIG. 6 illustrating an increase in the gain shaping control signal as shown by line 106 is illustrative. In other embodiments, a decrease in the gain shaping control signal as shown by line 106' is also possible. This behavior of the gain shaping control signal output by gain shaping circuit 84 can be implemented using a lookup table as a function of the absolute value of the amplitude of signal BB_dpd. The gain shaping control signal can be further optimized based on the information provided by gain shape analyzer 82 to prevent or eliminate any detected kinks in the overall gain of the transmit path.

Figure 7:
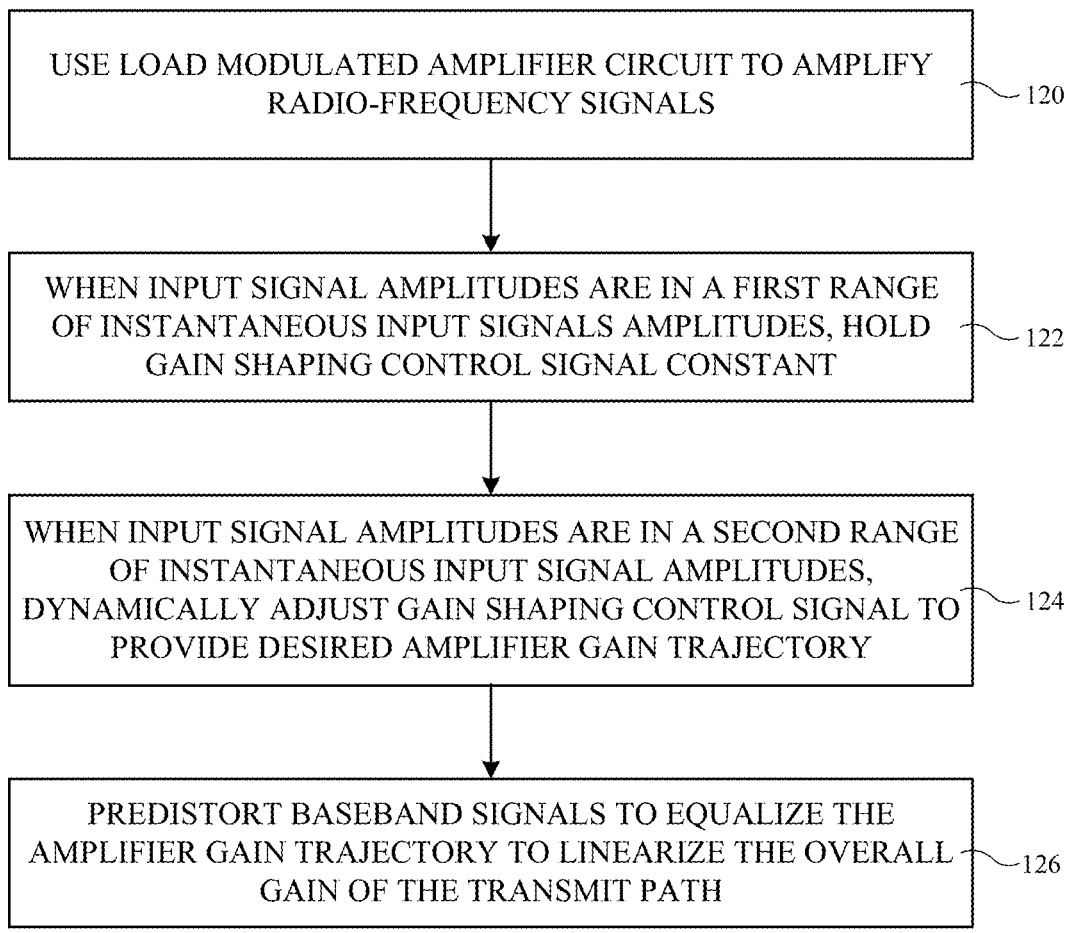
FIG. 7 is a flow chart of illustrative operations for using wireless circuitry of the type shown in FIG. 3 to linearize the gain of a transmit path in accordance with some embodiments.

FIG. 7 is a flow chart of illustrative operations for using wireless circuitry 24 of the type shown in FIG. 3 to linearize the gain of the transmit path. During the operations of block 120, load modulated amplifier circuit 50 can be used to amplify radio-frequency signals. For example, amplifier circuit 50 can receive upconverted (modulated) radio-frequency signals from upconverter 68 and generate corresponding amplified radio-frequency signals that are conveyed to antenna 42 for transmission via one or more additional radio-frequency front end components (e.g., via matching circuit 70, radio-frequency coupler 72, and/or other front end components).

The adjustable load component of amplifier circuit 50 can be selectively tuned based on the instantaneous signal amplitude of the baseband signals generated at the output of digital predistortion circuit 64. When the instantaneous signal amplitude of BB_dpd (or BB_ref) is within a first range of instantaneous amplifier input signal amplitudes (e.g., an unmodulated signal range corresponding to amplifier output power levels less than or equal to P2 in the example of FIG. 4), then gain shaping circuit 84 can keep the gain shaping control signal constant. In other words, amplifier load impedance $Z_L$ is kept constant for the unmodulated signal range. This is shown in the operations of block 122. Although shown as a separate step, the operations of block 122 can occur simultaneously with or can be overlaid on top of the operations of block 120.

When the instantaneous signal amplitude of BB_dpd (or BB_ref) is within a second range of instantaneous amplifier input signal amplitudes (e.g., a modulated signal range corresponding to amplifier output power levels greater than P2 in the example of FIG. 4), then gain shaping circuit 84 can adjust the gain shaping control signal in real time to provide amplifier circuit 50 with the desired smooth amplifier gain trajectory (see, e.g., exemplary gain trajectory 102 shown in FIG. 4). In other words, amplifier load impedance $Z_L$ is varied for the modulated signal range. This is shown in the operations of block 124. Although shown as a separate step, the operations of block 124 can occur simultaneously with or can be overlaid on top of the operations of block 120. The operations of blocks 122 and 124 should not occur simultaneously but may alternate between the two blocks as the amplitude of the input baseband signal changes.

During the operations of block 120, digital predistortion circuit 64 can be used to selectively predistort the baseband signals output from processor 26 to equalize the amplifier gain trajectory 102. The digital predistortion circuit 64 can be idle (switched out of use) when the instantaneous signal amplitude of BB_dpd (or BB_meas) is within a subrange of instantaneous amplifier signal amplitudes corresponding to the region where gain trajectory 102 is flat (see, e.g., FIG. 5). The digital predistortion circuit 64 can be activated (switched into use) when the instantaneous signal amplitude of BB_dpd (or BB_meas) is within a remaining range of instantaneous amplifier signal amplitudes corresponding to the region where gain trajectory 102 is changing (non-flat). This is shown in the operations of block 126. Although shown as a separate step, the operations of block 124 can occur simultaneously with or can be overlaid on top of the operations of block 120. Selectively predistorting the baseband signals in this way can help linearize the overall gain of the transmit path (e.g., to provide a linear gain response from output of processor 26 to the output of amplifier circuit 50).

The methods and operations described above in connection with FIGS. 1-7 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 and/or wireless communications circuitry 24 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry in wireless circuitry 24, processing circuitry 18 of FIG. 1, etc.). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. Wireless circuitry comprising:
    a digital predistortion circuit configured to receive a baseband reference signal and to selectively predistort the baseband reference signal to output either the baseband reference signal or a predistorted signal;
    an upconversion circuit configured to receive the baseband reference signal or the predistorted signal and configured to output a corresponding radio-frequency signal;
    a load modulated amplifier circuit configured to receive the radio-frequency signal and to output a corresponding amplified radio-frequency signal, the load modulated amplifier circuit including an adjustable load component having a constant impedance when an instantaneous signal amplitude of the baseband reference signal or the predistorted signal is within a first range and having a varying impedance when the instantaneous signal amplitude of the baseband reference signal or the predistorted signal is within a second range different than the first range; and
    a gain shaping circuit configured to receive the baseband reference signal or the predistorted signal and to output a control signal for tuning the adjustable load component, wherein the load modulated amplifier circuit has a gain and wherein the gain shaping circuit is configured to adjust the control signal such that a derivative of the gain is continuous.

2. The wireless circuitry of claim 1, the gain shaping circuit being further configured to:

keep the control signal constant when the instantaneous signal amplitude of the baseband reference signal or the predistorted signal is within the first range; and vary the control signal when the instantaneous signal amplitude of the baseband reference signal or the predistorted signal is within the second range.

3. The wireless circuitry of claim 2, wherein the gain shaping circuit is configured to vary the control signal as a function of the instantaneous signal amplitude of the baseband reference signal or the predistorted signal.

4. The wireless circuitry of claim 1, wherein the digital predistortion circuit is configured to linearize the gain of the load modulated amplifier circuit.

5. The wireless circuitry of claim 1, wherein the gain varies when the instantaneous signal amplitude of the baseband reference signal is within the first range and varies when the instantaneous signal amplitude of the baseband reference signal is within the second range.

6. The wireless circuitry of claim 2, further comprising:
a radio-frequency coupler coupled between the load modulated amplifier circuit and an antenna;
a downconversion circuit configured to demodulate a radio-frequency signal coupled from the radio-frequency coupler to generate a corresponding demodulated signal; and
an analog-to-digital converter configured to convert the demodulated signal from an analog domain to a digital domain to generate a corresponding measured signal.

7. The wireless circuitry of claim 6, further comprising an alignment circuit configured to phase and time align the baseband reference signal and the measured signal or to phase and time align the predistorted signal and the measured signal.

8. The wireless circuitry of claim 7, further comprising a gain calculation circuit configured to receive the baseband reference signal and the measured signal and further configured to compute an instantaneous gain value based on the received baseband reference signal and the received measured signal.

9. The wireless circuitry of claim 8, further comprising a gain shape analyzer circuit configured to receive the computed instantaneous gain value, to monitor recently computed gain values output from the gain calculation circuit, and to output information to the gain shaping circuit.

10. The wireless circuitry of claim 7, further comprising a gain calculation circuit configured to receive the predistorted signal and the measured signal and further configured to compute an instantaneous gain value based on the received predistorted signal and the received measured signal.

11. A method of operating wireless circuitry, comprising:
receiving a baseband signal from one or more processors;
upconverting the baseband signal to a radio-frequency signal;
with a load modulated amplifier circuit, amplifying the radio-frequency signal;
downconverting a portion of the amplified radio-frequency signal to produce a demodulated signal;
converting the demodulated signal from an analog domain to a digital domain to produce a measured signal;
aligning the measured signal and the baseband signal in phase and time;
with a gain shaping circuit, outputting a control signal based on at least the measured signal to an adjustable load component in the load modulated amplifier circuit;

keeping the control signal constant when an instantaneous amplitude of the baseband signal is within a first range; and varying the control signal when the instantaneous amplitude of the baseband signal is within a second range non-overlapping with the first range.

12. The method of claim 11, further comprising predistorting the baseband signal to linearize a gain of the load modulated amplifier circuit.

13. The method of claim 12, wherein the gain shaping circuit is configured to adjust the control signal such that a derivative of the gain is continuous.

14. The method of claim 11, further comprising
computing an instantaneous gain value based on the baseband signal and the measured signal;
analyzing the instantaneous gain value to determine whether a derivative of the gain of the load modulated amplifier circuit is continuous; and
in response to determining that the derivative of the gain of the load modulated amplifier circuit is not continuous, adjusting the gain shaping circuit.

15. The method of claim 12, further comprising aligning the measured signal and the predistorted baseband signal in phase and time.

16. An electronic device comprising:
one or more processors configured to generate a baseband signal;
a predistortion circuit configured to selectively predistort the baseband signal to output either the baseband signal or a predistorted signal;
a modulator configured to convert the baseband signal or the predistorted signal to a radio-frequency signal;
a load-line modulated amplifier circuit configured to amplify the radio-frequency signal; and
gain shaping circuitry having a first input configured to receive the baseband signal from the one or more processors, a second input configured to receive a portion of the amplified radio-frequency signal via a radio-frequency coupler, a third input configured to receive the baseband signal or the predistorted signal from the predistortion circuit, and an output coupled to an adjustable impedance in the load-line modulated amplifier circuit.

17. The electronic device of claim 16, wherein the gain shaping circuitry comprises:
a gain shaping circuit configured to generate a control signal for tuning the adjustable impedance based on an instantaneous signal amplitude of the baseband signal or the predistorted signal, the control signal having a constant value when the instantaneous signal amplitude of the baseband signal or the predistorted signal is within a first signal range and having a varying value when the instantaneous signal amplitude of the baseband signal or the predistorted signal is within a second signal range greater than the first signal range.

18. The electronic device of claim 17, wherein the gain shaping circuitry comprises:
a demodulator configured to convert the portion of the amplified radio-frequency signal to a demodulated signal;
an analog-to-digital converter configured to convert the demodulated signal to a digital measured signal;
a gain calculation circuit configured to compute a gain value based on the baseband signal and the digital measured signal; and a gain shape analyzing circuit configured to monitor the computed gain value and to provide information to the gain shaping circuit.

\* \* \* \* \*